US012361530B2

(12) United States Patent
Tsou et al.

(10) Patent No.: US 12,361,530 B2
(45) Date of Patent: Jul. 15, 2025

(54) CURVE ALIGNMENT METHOD AND CURVE ALIGNMENT APPARATUS

(71) Applicant: Materials Analysis Technology Inc., Hsinchu County (TW)

(72) Inventors: Hsiang-Yu Tsou, Hsinchu (TW); Hung-Jen Chen, Hsinchu (TW)

(73) Assignee: Materials Analysis Technology Inc., Hsinchu County (TW)

( * ) Notice: Subject to any disclaimer, the term of this patent is extended or adjusted under 35 U.S.C. 154(b) by 446 days.

(21) Appl. No.: 17/857,172

(22) Filed: Jul. 5, 2022

(65) Prior Publication Data

US 2023/0326000 A1 Oct. 12, 2023

(30) Foreign Application Priority Data

Apr. 8, 2022 (TW) .................................. 111113396

(51) Int. Cl.
*G06T 7/00* (2017.01)
*G06T 7/38* (2017.01)
*G06T 11/20* (2006.01)

(52) U.S. Cl.
CPC .. *G06T 7/0002* (2013.01); *G06T 2207/10061* (2013.01); *G06T 2207/20096* (2013.01)

(58) Field of Classification Search
CPC ......... G06T 7/0002; G06T 2207/10061; G06T 2207/20096; G06T 7/38; G06T 11/203; G06T 7/73; G06T 2207/10056
See application file for complete search history.

(56) References Cited

U.S. PATENT DOCUMENTS

| 5,916,747 A | * | 6/1999 | Gilchrist | .......... G01N 27/44717 |
| | | | | 435/6.12 |
| 8,515,714 B2 | * | 8/2013 | Witowski | ................ G06F 30/20 |
| | | | | 703/2 |

(Continued)

FOREIGN PATENT DOCUMENTS

| CN | 101488223 | 7/2009 |
| CN | 104537629 | 4/2015 |

(Continued)

OTHER PUBLICATIONS

Law, M.W.K.. (2012). Dilated Divergence Based Scale-Space Representation for Curve Analysis. In: Fitzgibbon, A., Lazebnik, S., Perona, P., Sato, Y., Schmid, C. (eds) Computer Vision—ECCV 2012. ECCV 2012. Lecture Notes in Computer Science, vol. 7573. Springer, B, 557-571 (Year: 2012).*

(Continued)

*Primary Examiner* — Siamak Harandi
(74) *Attorney, Agent, or Firm* — JCIPRNET

(57) ABSTRACT

A curve alignment method and apparatus are provided. In the method, data obtained by at least one equipment analyzing a test sample is retrieved to generate test curves. In response to an alignment operation of directing a first point around a first curve to a second point around a second curve among the test curves, a correspondence between features corresponding to the first and second points is recorded, and correspondences of alignment operations are collected as feature data. Data obtained by the equipment analyzing a current sample is retrieved to generate current curves, and a third point matching the first feature on a third curve and a fourth point matching the second feature on a fourth curve are searched according to the correspondences. At least one of the third curve and the fourth curve is adjusted to align the third point with the fourth point.

20 Claims, 6 Drawing Sheets

(56) References Cited

U.S. PATENT DOCUMENTS

2005/0283989 A1* 12/2005 Pettersson ............ G01B 21/045
                                                                             33/502
2011/0301921 A1    12/2011  Stander

FOREIGN PATENT DOCUMENTS

| CN | 109461176 | 3/2019 |
| --- | --- | --- |
| JP | 2016090479 | 5/2016 |
| JP | 2019039884 | 3/2019 |
| JP | 2021014986 | 2/2021 |
| TW | 201915806 | 4/2019 |

OTHER PUBLICATIONS

"Notice of allowance of Japan Counterpart Application", issued on Sep. 15, 2023, p. 1-p. 3.
"Office Action of Taiwan Counterpart Application", issued on Dec. 6, 2022, p. 1-p. 5.

\* cited by examiner

CURVE ALIGNMENT METHOD AND CURVE ALIGNMENT APPARATUS

CROSS-REFERENCE TO RELATED APPLICATION

This application claims the priority benefit of Taiwan application serial no. 111113396, filed on Apr. 8, 2022. The entirety of the above-mentioned patent application is hereby incorporated by reference herein and made a part of this specification.

BACKGROUND

Technical Field

The disclosure relates to a data processing method and apparatus, and more particularly to a curve alignment method and a curve alignment apparatus.

Description of Related Art

With the advancement of microscopy technology, various microscopic observation apparatuses, such as an atomic force microscope (AFM) and an electron microscope such as a transmission electron microscope (TEM), a scanning electron microscope (SEM), a secondary ion mass spectrometer (SIMS), a spread resistance probe (SRP), an energy-dispersive X-ray spectrometer (EDS), an X-ray photoelectron spectrometer (XPS), a field-emission Auger electron spectrometer (FE-AES), and a film thickness measuring instrument (a-step), have emerged accordingly. The high-resolution three-dimensional image technology of the electron microscope is applied in the analysis and inspection applications of clinical medicine and biomolecular research, which can effectively increase the resolution of observed images and the accuracy of observation results.

During the process of analyzing a sample using the microscopic observation apparatus, it is necessary to integrate analysis results of different equipment, including adjusting, expanding, merging, etc. inspection data of the equipment, so as to obtain a completeness analysis report of the sample. Due to the different specifications, characteristics, operating manners, and operating environments of the equipment, there may be differences such as offset and deformation between curves of the inspection data. Therefore, when integrating the inspection data, it is necessary to rely on the operator to manually adjust the curves based on experience, so as to find correlations and align accordingly, thereby obtaining the correct analysis results, so the analysis process is time-consuming and labor-intensive.

SUMMARY

The disclosure provides a curve alignment method and a curve alignment apparatus, which can implement automatic adjustment and alignment of curves of data of multiple equipment through learning operating experiences of previous curve alignments.

The curve alignment method of the embodiment of the disclosure is applicable to an electronic apparatus having a data retrieving apparatus and a processor. The method includes the following steps. Data obtained by at least one equipment analyzing a test sample is retrieved using the data retrieving apparatus to generate multiple test curves. In response to an alignment operation of directing a first point around a first curve to a second point around a second curve among the test curves, a correspondence between a first feature corresponding to the first point and a second feature corresponding to the second point is recorded, and correspondences of multiple alignment operations are collected as feature data. Data obtained by the equipment analyzing a current sample is retrieved using the data retrieving apparatus to generate multiple current curves. According to each correspondence in the recorded feature data, for a third curve and a fourth curve among the current curves, a third point matching the first feature on the third curve and a fourth point matching the second feature on the fourth curve are searched. At least one of the third curve and the fourth curve is adjusted to align the third point with the fourth point.

The curve alignment apparatus of the embodiment of the disclosure includes a data retrieving apparatus, a storage apparatus, and a processor. The data retrieving apparatus is used to connect at least one equipment. The processor is coupled to the data retrieving apparatus and the storage apparatus, and is configured to perform the following. Data obtained by at least one equipment analyzing a test sample is retrieved using the data retrieving apparatus to generate multiple test curves. In response to an alignment operation of directing a first point around a first curve to a second point around a second curve among the test curves, a correspondence between a first feature corresponding to the first point and a second feature corresponding to the second point is recorded, and correspondences of multiple alignment operations are collected as feature data. Data obtained by the equipment analyzing a current sample is retrieved using the data retrieving apparatus to generate multiple current curves. According to each correspondence in the recorded feature data, for a third curve and a fourth curve among the current curves, a third point matching the first feature on the third curve and a fourth point matching the second feature on the fourth curve are searched. At least one of the third curve and the fourth curve is adjusted to align the third point with the fourth point.

Based on the above, in the curve alignment method and the curve alignment apparatus of the disclosure, the alignment operations performed by the operator on the curves of output data of a single equipment or different equipment are retrieved and recorded as the feature data, and are used to perform feature comparisons and adjustments on the curves of the subsequent output data of the equipment, thereby implementing automatic alignments of the curves of the data of a single equipment or multiple equipment.

In order for the features and advantages of the disclosure to be more comprehensible, the following specific embodiments are described in detail in conjunction with the drawings.

DETAILED DESCRIPTION OF DISCLOSED EMBODIMENTS

The embodiments of the disclosure provide a curve alignment method and a curve alignment apparatus. For differences such as offset and deformation between curves of data obtained by a single equipment or different equipment analyzing a test sample, through learning alignment operations performed by the operator on the curves and recording the alignment operations as feature data, when a curve of a current sample is subsequently obtained, a feature comparison is performed on the curve based on the feature data, so as to find correlations between the curves and align accordingly, thereby correctly and quickly integrating analysis results of different equipment.

Figure 1:
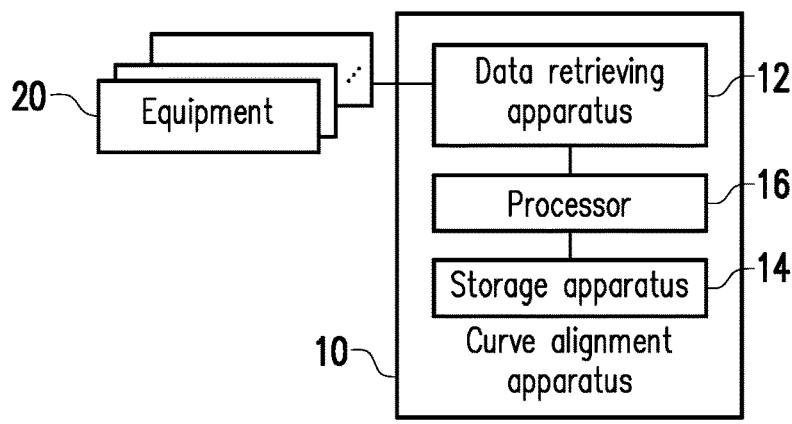
FIG. 1 is a block diagram of a curve alignment apparatus according to an embodiment of the disclosure.

FIG. 1 is a block diagram of a curve alignment apparatus according to an embodiment of the disclosure. Please refer to FIG. 1. A curve alignment apparatus 10 of the embodiment is, for example, a personal computer, a server, a workstation, or other apparatuses with computing functions, and includes a data retrieving apparatus 12, a storage apparatus 14, and a processor 16 whose functions are described as follows.

The data retrieving apparatus 12 is, for example, a wired connection apparatus such as a universal serial bus (USB), a RS232, a universal asynchronous receiver/transmitter (UART), an inter-integrated circuit (I2C), a serial peripheral interface (SPI), a display port, a thunderbolt, or a local area network (LAN) interface, or a communication protocol wireless connection apparatus supporting wireless fidelity (Wi-Fi), RFID, Bluetooth, infrared, near-field communication (NFC), device-to-device (D2D), etc. The data retrieving apparatus 12 may be connected to at least one equipment 20 for analyzing a sample, so as to retrieve data obtained by the equipment 20 analyzing the sample. The equipment 20 is, for example, various micro-area component analysis apparatuses such as a secondary ion mass spectrometer (SIMS), a spread resistance analyzer (SRP), an energy-dispersive X-ray spectrometer (EDS), an X-ray photoelectron spectrometer (XPS), and a field-emission Auger electron spectrometer (FE-AES), which is not limited herein.

The storage apparatus 14 is, for example, any type of fixed or removable random access memory (RAM), read-only memory (ROM), flash memory, hard disk drive, other similar apparatuses, or a combination of the apparatuses, and is used to store a program executable by the processor 16. In some embodiments, the storage apparatus 14 may record the data retrieved by the data retrieving apparatus 12 and the feature data obtained by performing the alignment operation and feature identification on the curves of the data. The recorded data are stored in a database in the form of, for example, a text file, a spreadsheet, or a tree structure, and are used for searching, and the storage manner thereof is not limited in the embodiment.

The processor 16 is coupled to the data retrieving apparatus 12 and the storage apparatus 14, and is used to control the running of the curve alignment apparatus 10. In some embodiments, the processor 16 is, for example, a central processing unit (CPU), other programmable general-purpose or specific-purpose microprocessors, digital signal processors (DSPs), programmable controllers, application specific integrated circuits (ASICs), field programmable gate arrays (FPGAs), programmable logic controllers (PLCs), other similar apparatuses, or a combination of the apparatuses, and may load and execute the program stored in the storage apparatus 14 to execute the curve alignment method of the embodiment of the disclosure.

In some embodiments, the curve alignment apparatus 10 further includes a display for displaying the curve of the data retrieved by the data retrieving apparatus 12 and an operating apparatus for operating the curve displayed on the display, wherein the display is, for example, a liquid-crystal display (LCD), and the operating apparatus is, for example, an apparatus such as a mouse, a keyboard, a touch panel, and a touch screen, which is not limited herein.

Figure 2:
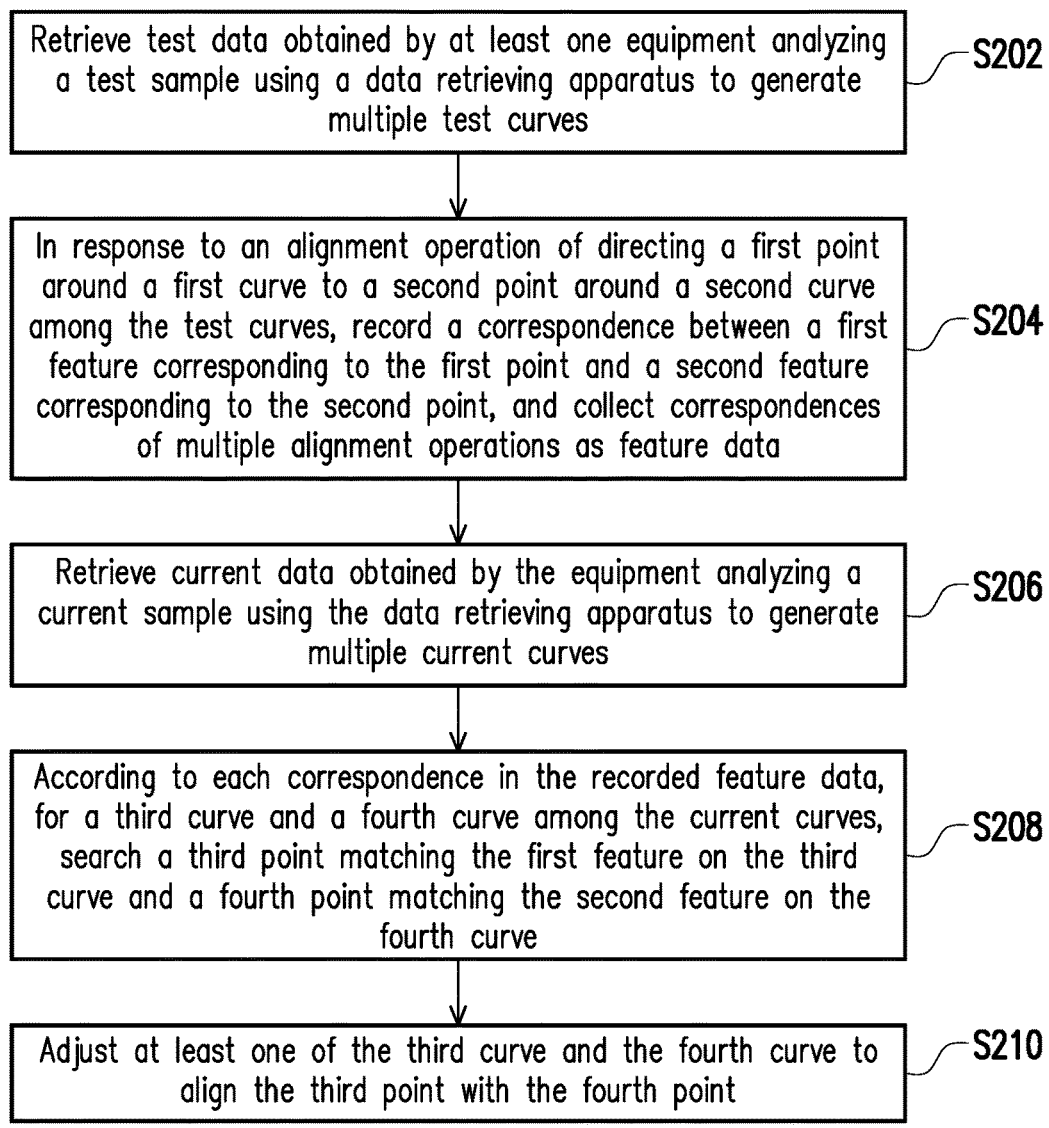
FIG. 2 is a flowchart of a curve alignment method according to an embodiment of the disclosure.

FIG. 2 is a flowchart of a curve alignment method according to an embodiment of the disclosure. Please refer to FIG. 1 and FIG. 2 at the same time. The method of the embodiment is applicable to the curve alignment apparatus 10 of FIG. 1, and the detailed steps of the curve alignment method of the disclosure will be described below in conjunction with various elements of the curve alignment apparatus 10.

In Step S202, test data obtained by the at least one equipment 20 analyzing a test sample is retrieved using the data retrieving apparatus 12 by the processor 16 of the curve alignment apparatus 10 to generate multiple test curves. The processor 16, for example, uses the data retrieving apparatus 12 to retrieve raw data of the test sample analyzed by the equipment 20, draws the raw data into the test curves, which include curve information such as a name, a number of points, and remarks for generating the test curves, and calculates an average value, a minimum value, a maximum value, and other meaningful statistical information of the test curves.

Figure 3:
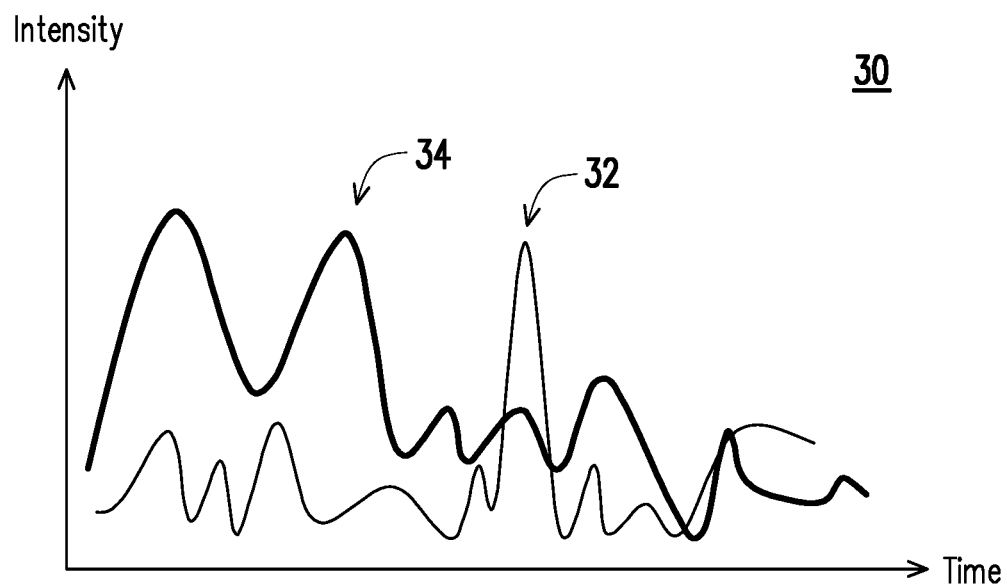
FIG. 3 is a curve diagram according to an embodiment of the disclosure.

In some embodiments, the processor 16 may further display the drawn test curves on the display, and list the curve information, the statistical information, and axis information. For example, in a curve diagram 30 shown in FIG. 3, test curves 32 and 34 and the related axis information (time and intensity) thereof are displayed. The test curves 32 and 34 represent changes in signal intensity over time obtained by different equipment analyzing a test sample.

In some embodiments, the processor 16 may receive an adjustment operation performed by the operator on the test curve through the operating apparatus. The operator may drag the test curve using a mouse (by holding down a left button or a right button) to perform operations such as translation and scaling on the test curve, or perform operations such as cutting and merging on the test curve by clicking the test curve using the mouse, which is not limited herein. In some embodiments, the operator may direct a first point around a first curve to a second point around a second curve among the test curves using the mouse to perform the alignment operation on the test curve. The alignment operation is, for example, scaling the first or second curve with a curve starting point or a self-defined baseline as the basis (that is, a point of the test curve located on the baseline is fixed) to align the first point with the second point.

In Step S204, in response to the alignment operation of directing the first point around the first curve to the second point around the second curve among the test curves, the processor 16 records a correspondence between a first feature corresponding to the first point and a second feature corresponding to the second point in the storage apparatus 14, and collects correspondences of multiple alignment operations as feature data. The feature data includes, for example, positions of the first point and the second point, names of corresponding curves, feature points of corresponding features, corresponding point distances, etc., which is not limited herein.

In detail, in some embodiments, the first feature includes, for example, multiple feature points located around the first point on the first curve, and the second feature includes multiple feature points located around the second point on the second curve. The feature points are, for example, obtained by sampling at equal time intervals or equal distances according to the shape of the curve, and the number of feature points may be determined according to the degree of deformation or the expected fineness of the curve, and the obtaining manner thereof is not limited in the embodiment. In some embodiments, the first feature records a relative relationship (that is, a global feature) of the first point and the first curve, and the second feature records a relative relationship of the second point and the second curve, but is not limited thereto.

In Step S206, current data obtained by the equipment 20 analyzing a current sample is retrieved using the data retrieving apparatus 12 by the processor 16 to generate multiple current curves.

In Step S208, the processor 16 searches a third point matching the first feature on a third curve and a fourth point matching the second feature on a fourth curve for the third curve and the fourth curve among the current curves according to each correspondence in the recorded feature data. The processor 16, for example, compares the degree of similarity of features in the third curve and the fourth curve using the feature data according to information such as an equipment type, a curve name, a position, a feature point, and a resolution corresponding to the third curve and the fourth curve, thereby filtering out the alignment operation suitable for the third curve and the fourth curve, so as to perform automatic alignments.

Specifically, the processor 16, for example, respectively performs a feature comparison on the third curve and the fourth curve using a sliding window, so as to search for the third point matching the first feature from the third curve and to search for the fourth point matching the second feature from the fourth curve. The feature comparison includes a slope comparison, a correlation comparison, or a position comparison, but the embodiment is not limited thereto.

In some embodiments, the feature data used in the feature comparison may be adjusted in weight according to, for example, a cumulative number of records of the alignment operations received at a test stage or confirmation operations received at an implementation stage. The adjusted weights are also, for example, stored in the database, and are used as the basis for subsequent feature comparison. That is, if the accumulative number of times of the alignment operation of corresponding a certain first feature to a certain second feature is relatively high, when the feature data thereof is matched with the features in the current curve in future searches, the alignment operation is more likely to be called. Thereby, the weight of the correspondence pointed to by the alignment operation for the feature comparison may be adjusted, so that a comparison result reflects the actual operation of the operator, thereby optimizing the user experience. In addition, after searching for the third point matching the first feature and the fourth point matching the second feature, in response to the confirmation operation of the third point and the fourth point by the operator, the weight of the correspondence confirmed by the confirmation operation for the feature comparison may be adjusted, so that the comparison result reflects the actual operation of the operator. Conversely, if the operator deletes the correspondence between a certain third point and a certain fourth point, the weight of the correspondence for the feature comparison may be reduced to reduce the possibility of the correspondence being called.

In Step S210, the processor 16 adjusts at least one of the third curve and the fourth curve to align the third point with the fourth point. The processor 16, for example, performs proportional scaling on the third curve and/or the fourth curve to align the third point with the fourth point. In some embodiments, the processor 16 may additionally define a baseline for adjusting the third curve and the fourth curve, and adjust the third curve or the fourth curve with the baseline as the basis (that is, a point of the third curve or the fourth curve on the baseline is fixed) to align the third point with the fourth point. In some embodiments, the processor 16 may further define a baseline based on positions of the aligned third point and fourth point, and continue to adjust the third curve or the fourth curve with the baseline as the basis.

Figure 4A:
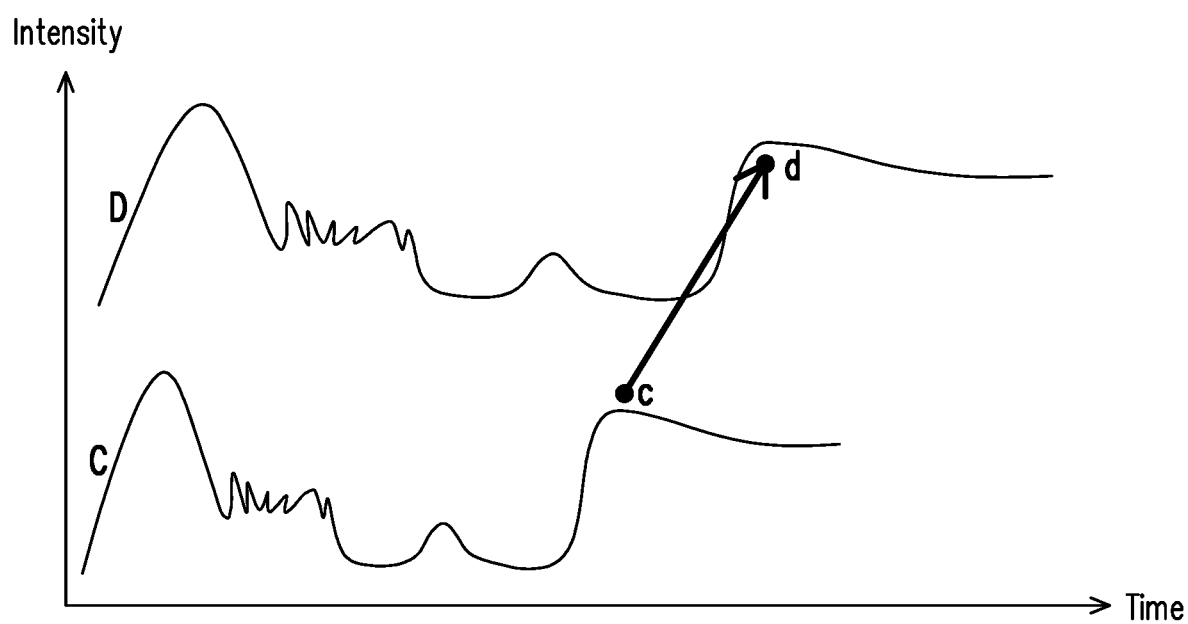
FIG. 4A to FIG. 4C are examples of a curve alignment method according to an embodiment of the disclosure.
Figure 4B:
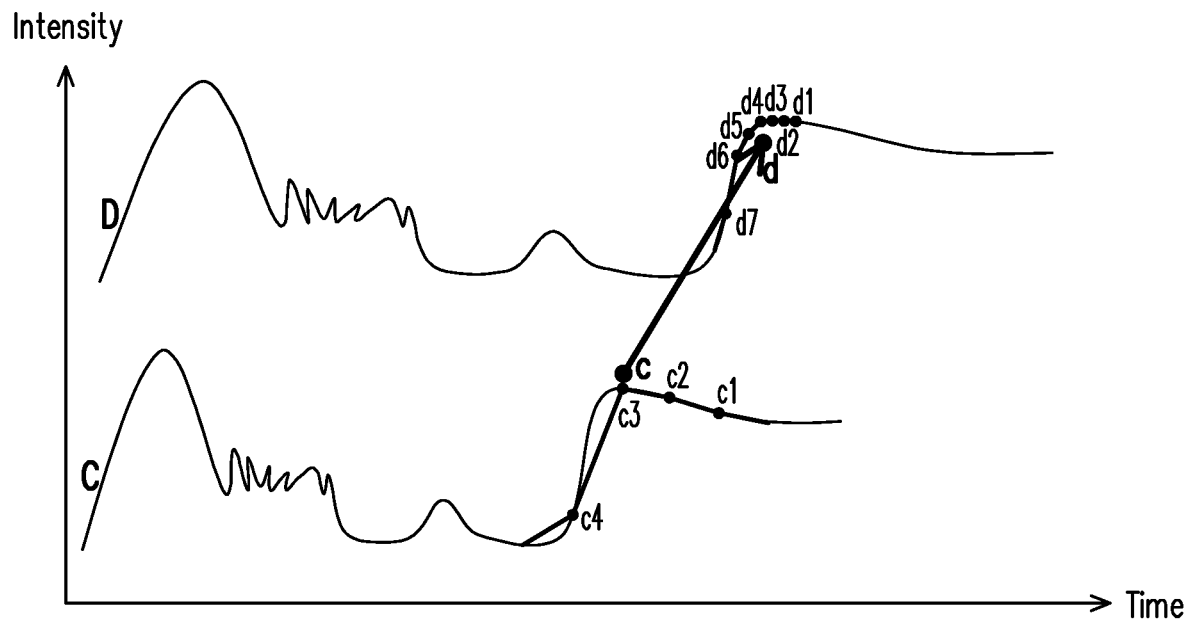
Figure 4C:
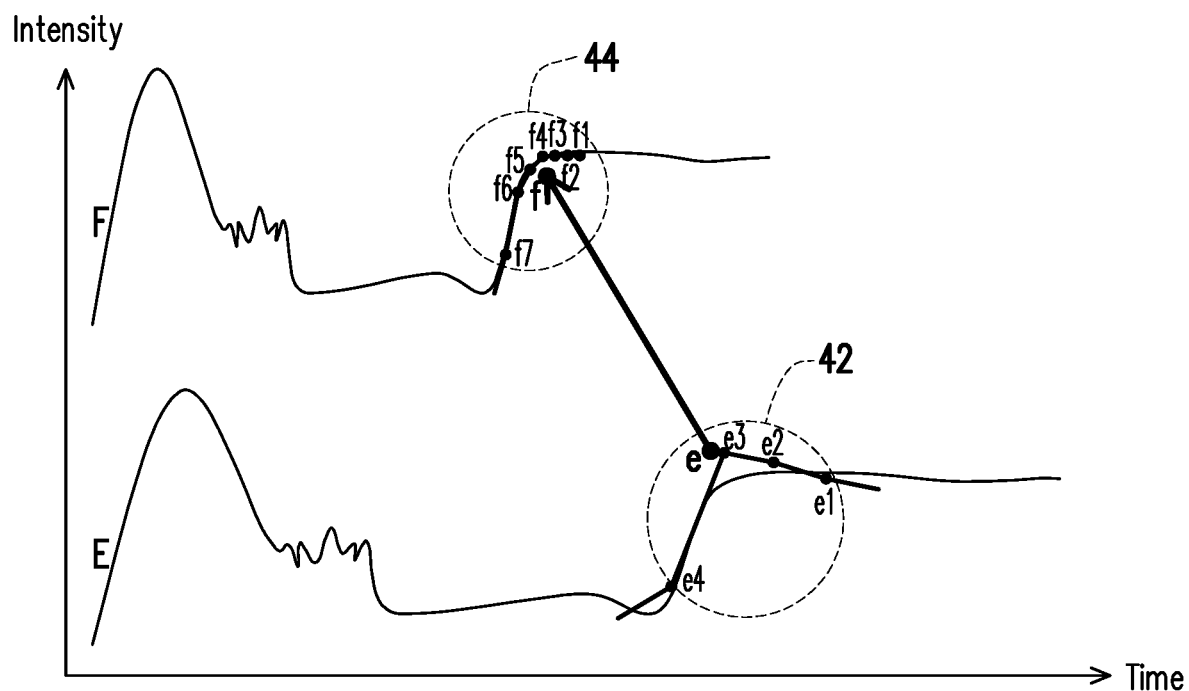

For example, FIG. 4A to FIG. 4C are examples of a curve alignment method according to an embodiment of the disclosure. Please refer to FIG. 4A. In the embodiment, test curves C and D generated by different equipment analyzing data of a test sample are displayed on the display by the curve alignment apparatus, and an alignment operation of directing a point c around the test curve C to a point d around the test curve D by the operator is received. Next, please refer to FIG. 4B. The curve alignment apparatus uses multiple feature points c1 to c4 corresponding to the point c on the test curve C as a first feature, uses multiple feature points d1 to d7 corresponding to the point d on the test curve D as a second feature, and records a correspondence between the first feature and the second feature as feature data. Please refer to FIG. 4C. When the curve alignment apparatus receives data obtained by the same equipment or the same type of equipment analyzing a current sample and uses the data to generate current curves E and F, the previously recorded feature data is used to analyze multiple features on the current curves E and F, thereby finding a third feature (including feature points e1 to e4) matching the first feature (including the feature points c1 to c4) on the current curve E and a corresponding point e thereof, and finding a fourth feature (including feature points f1 to f7) matching the second feature (including the feature points d1 to d7) on the current curve F and a corresponding point f thereof. Accordingly, the curve alignment apparatus may adjust the current curve E and/or the current curve F to align the point e with the point f, thereby completing the alignment operation of the current curve E and the current curve F.

Figure 5A:
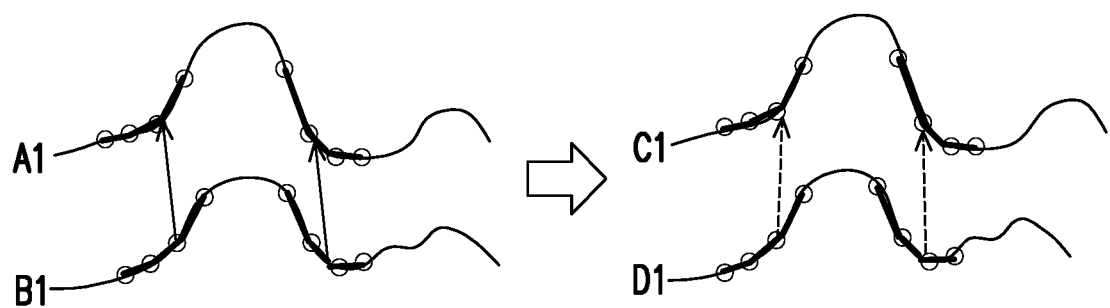
FIG. 5A and FIG. 5B are examples of a curve alignment method according to an embodiment of the disclosure.
Figure 5B:
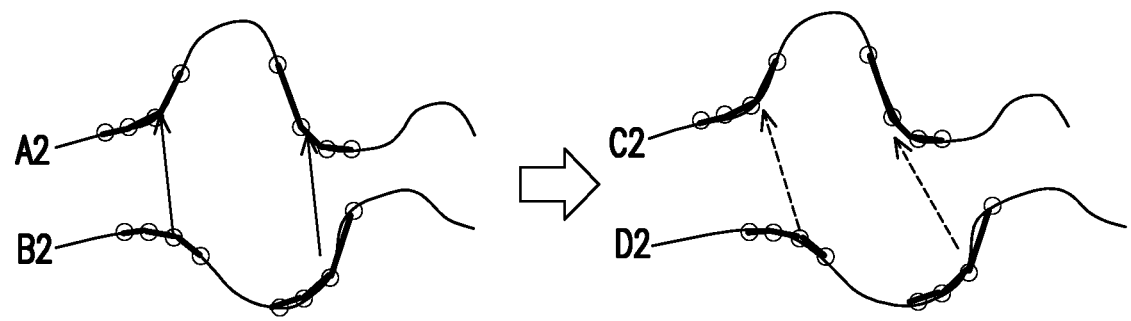

It should be noted that the correspondence between the first feature and the second feature may include multiple alignment operations performed by the operator on the test curves. For example, FIG. 5A and FIG. 5B are examples of a curve alignment method according to an embodiment of the disclosure. Please refer to FIG. 5A. For test curves A1 and B1, the operator may perform two alignment operations of directing an edge of a crest in the test curve B1 to an edge of a corresponding crest in the test curve A1 and record a correspondence between features corresponding to the two alignment operations as feature data. For current curves C1 and D1, the previously recorded feature data may be used to find a crest in the current curve C1 corresponding to a crest in the current curve D1, thereby completing the alignment operation of the current curves C1 and D1. Please refer to FIG. 5B. For test curves A2 and B2, the operator may perform two alignment operations of directing an edge of a trough in the test curve B2 to an edge of a corresponding crest in the test curve A2 and record a correspondence between features corresponding to the two alignment operations as feature data. For current curves C2 and D2, the previously recorded feature data may be used to find a crest in the current curve C2 corresponding to a trough in the current curve D2, thereby completing the alignment operation of the current curves C2 and D2.

Through the above method, the curve alignment apparatus of the embodiment of the disclosure can learn the experience of the operator in adjusting the curves of the data of the equipment to be applied to the feature comparisons and the automatic alignments of curves of subsequent data, thereby quickly and correctly integrating the analysis results of different equipment, and assisting the operator in observing the correlations between the curves of the data of the equipment.

It should be noted that in some embodiments, the curve alignment apparatus of the embodiment of the disclosure may further divide an analysis curve into multiple segments according to the shape and the distribution of features in the analysis curve, and respectively perform the feature comparison and the automatic alignment, thereby obtaining a more preferable analysis result.

Figure 6:
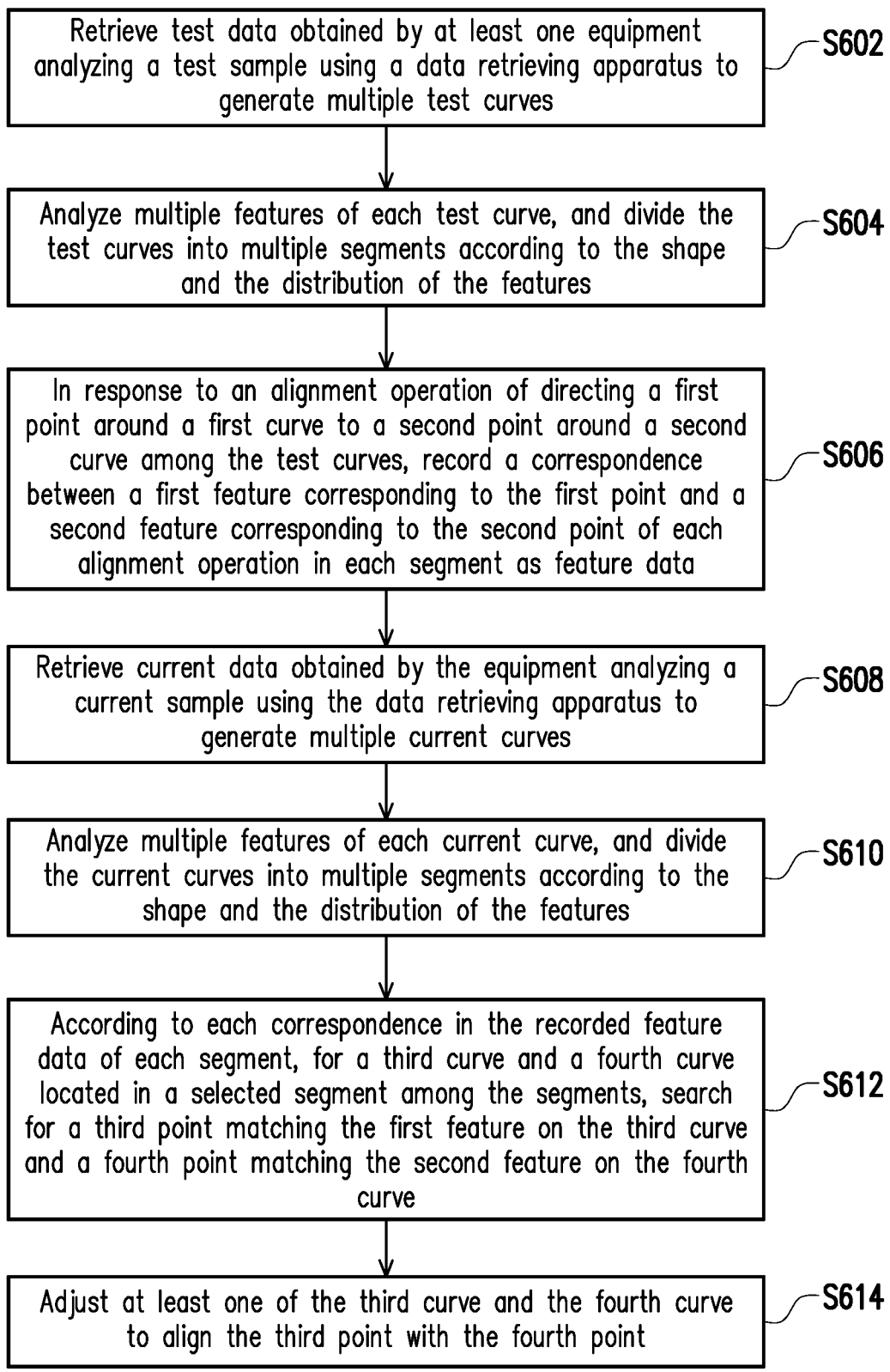
FIG. 6 is a flowchart of a curve alignment method according to an embodiment of the disclosure.

In detail, FIG. 6 is a flowchart of a curve alignment method according to an embodiment of the disclosure. Please refer to FIG. 1 and FIG. 6 at the same time. The method of the embodiment is applicable to the curve alignment apparatus 10 of FIG. 1, and the detailed steps of the curve alignment method of the disclosure will be described below in conjunction with various elements of the curve alignment apparatus 10.

In Step S602, test data obtained by the at least one equipment 20 analyzing a test sample is retrieved using the data retrieving apparatus 12 by the processor 16 of the curve alignment apparatus 10 to generate multiple test curves. The step is the same as or similar to Step S202 in the foregoing embodiment, so the detailed content thereof is not repeated here.

Different from the foregoing embodiment, in Step S604 of the embodiment, the processor 16 analyzes multiple features of each test curve, and divides the test curves into multiple segments according to the shape and the distribution of the features. The features are, for example, peaks, valleys, or other special shapes in the curves, which are not limited herein. The processor 16, for example, sets multiple peaks, multiple valleys, or other features that continuously appear in the curves as the same segment, and records alignment operations for different segments to be used for feature comparisons of subsequent similar segments.

In Step S606, in response to an alignment operation of directing a first point around a first curve to a second point around a second curve among the test curves, the processor 16 records a correspondence between a first feature corresponding to the first point and a second feature corresponding to the second point of each alignment operation in each segment as feature data. For each segment of the test curves, the processor 16 may record the correspondences between the features thereof according to the alignment operations on the curves in the segment by the operator, and use the correspondences as the feature data for subsequent feature comparison.

In Step S608, current data obtained by the equipment 20 analyzing a current sample is retrieved using the data retrieving apparatus 12 by the processor 16 to generate multiple current curves. Then in Step S610, multiple features of each current curve are analyzed, and the current curve is divided into multiple segments according to the shape and the distribution of the features. The processor 16 may divide the current curve in the same or similar manner as Step S604, or may divide the current curve by the foregoing manner for dividing the curves of the data of the same equipment according to the type of the equipment to which the current curve belongs, which is not limited herein.

In Step S612, the processor 16 searches for a third point matching the first feature on a third curve and a fourth point matching the second feature on a fourth curve for the third curve and the fourth curve located in the selected segment among the segments according to each correspondence in the recorded feature data of each segment. The processor 16, for example, calculates an eigenvalue of the features in each current curve for the current curves in each segment, thereby selecting the current curve for alignment in the selected segment according to the size of the calculated eigenvalue.

In detail, in some cases, features in certain segments of curves are not obvious enough, so the features cannot or are not easy to be used for feature comparison. Therefore, it is more preferable to observe a correspondence between the features of the curves, and adopt usable features (such as peaks, valleys, or other special shapes) in different segments as the basis for feature comparison. The features may be used to align the curves in the segment, and the embodiment does not limit the scope thereof.

In Step S614, at least one of the third curve and the fourth curve in the selected segment is adjusted by the processor 16 to align the third point with the fourth point.

It should be noted that in some embodiments, after completing the alignment of the curves in each selected segment, the processor 16, for example, re-segments and performs the feature comparisons on the current curves, and compares corresponding features obtained by adopting different segmentation manners, thereby finding all the corresponding features between the current curves to prevent the corresponding features from being missing due to segmentation errors.

Figure 7:
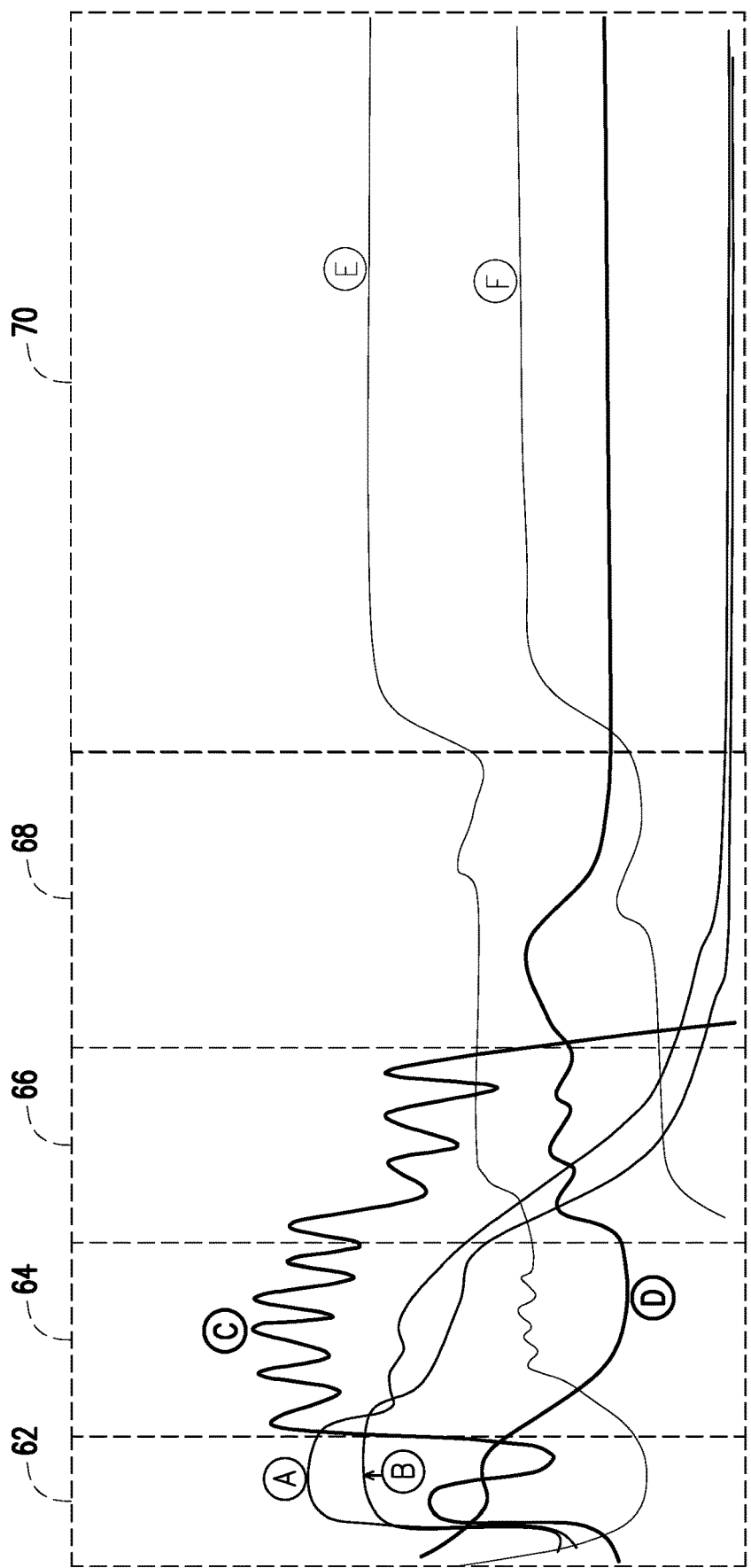
FIG. 7 is an example of a curve alignment method according to an embodiment of the disclosure.

For example, FIG. 7 is an example of a curve alignment method according to an embodiment of the disclosure. Please refer to FIG. 7. In the embodiment, test curves (including a curve A, a curve B, a curve C, a curve D, a curve E, and a curve F) generated by a single equipment or different equipment analyzing the same current sample is displayed on a display by a curve alignment apparatus. The curve alignment apparatus, for example, divides a segment 62 according to the densely changing curve A and curve B, divides a segment 64 according to corresponding fluctuations of the curve C and the curve E, divides a segment 66 according to 3 peaks of the curve C and 3 valleys of the curve D, divides a segment 68 according to the curve E and the curve F with similar fluctuating frequencies and amplitudes, and divides a segment 70 according to the curve E and the curve F with similar shapes. For the segments 62 to 70 of the current curves, the curve alignment apparatus, for example, implements the alignment operation in the segment 62 by aligning the curve B with the curve A, implements the alignment operation in the segment 64 by the continuous and alternating crests and troughs in the curve C and the curve E, implements the alignment operation in the segment 66 by aligning the 3 peaks of the curve C with the 3 valleys of the curve D, implements the alignment operation in the segment 68 by aligning the curve E with the curve F, and implements the alignment operation in the segment 70 by aligning the curve E with the curve F. By performing the alignment operations using the curves with obvious features in each of the segments 62 to 70, more preferable alignment results can be obtained.

In summary, in the curve alignment method and the curve alignment apparatus of the embodiments of the disclosure, through monitoring the alignment operations performed by the operator on the curves of the output data of a single equipment or different equipment and recording the alignment operations as the feature data, which is used to perform the feature comparisons on the curves of the subsequent output data of the equipment, thereby filtering out the appropriate alignment operation to be applied to the alignments of the current curves. In this way, the embodiments of the disclosure can convert complicated adjustment/alignment processes into experience to be fed back to the adjustments of the current curves, thereby implementing the automatic alignments of the curves, which can correctly and quickly integrate the analysis results of different equipment.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A curve alignment method, applicable to an electronic apparatus having a data retrieving apparatus and a processor, the method comprising:
   analyzing a test sample by at least one microscopic observation apparatus to obtain test data;
   retrieving, by the processor, the test data using the data retrieving apparatus to generate a plurality of test curves;
   in response to an alignment operation of directing a first point around a first curve to a second point around a second curve among the test curves, recording, by the processor, a correspondence between a first feature corresponding to the first point and a second feature corresponding to the second point, and collecting, by the processor, the correspondences of a plurality of the alignment operation as feature data;
   analyzing a current sample by the at least one microscopic observation apparatus to obtain current data;
   retrieving, by the processor, the current data using the data retrieving apparatus to generate a plurality of current curves;
   according to each of the correspondences in the recorded feature data, for a third curve and a fourth curve among the current curves, searching, by the processor, for a third point matching the first feature on the third curve and a fourth point matching the second feature on the fourth curve;
   adjusting, by the processor, at least one of the third curve and the fourth curve to align the third point with the fourth point; and
   generating, by the processor, a completeness analysis report of the current sample by integrating analysis results of the adjusted at least one of third curve and the fourth curve.

2. The method according to claim 1, further comprising:
   analyzing a plurality of features of each of the test curves, and dividing the test curves into a plurality of segments according to a shape and a distribution of the features; and
   recording a correspondence between the first feature corresponding to the first point and the second feature corresponding to the second point of each of the alignment operations in each of the segments as the feature data.

3. The method according to claim 2, further comprising:
   analyzing a plurality of features of each of the current curves, and dividing the current curves into a plurality of segments according to a shape and a distribution of the features; and
   according to each of the correspondences in the recorded feature data of each of the segments, for the third curve and the fourth curve located in a selected segment among the segments, searching for the third point matching the first feature on the third curve and the fourth point matching the second feature on the fourth curve; and
   adjusting at least one of the third curve and the fourth curve in the selected segment to align the third point with the fourth point.

4. The method according to claim 3, further comprising:
   for the current curves in each of the segments, calculating an eigenvalue of the features in each of the current curves; and
   according to a size of the eigenvalue, selecting the current curve for alignment in the selected segment.

5. The method according to claim 1, wherein the step of searching for the third point matching the first feature on the third curve and the fourth point matching the second feature on the fourth curve comprises:
   respectively performing a feature comparison on the third curve and the fourth curve using a sliding window to search for the third point and the fourth point, wherein the feature comparison comprises a slope comparison, a correlation comparison, or a position comparison.

6. The method according to claim 5, wherein after the step of searching for the third point matching the first feature on the third curve and the fourth point matching the second feature on the fourth curve, the method further comprises:
   in response to a confirmation operation for the searched third point and fourth point, adjusting at least one of the third curve and the fourth curve to align the third point with the fourth point; and
   accumulating a number of records of the correspondence between the first feature and the second feature, and adjusting a weight of the correspondence for the feature comparison according to the accumulated number of records.

7. The method according to claim 1, wherein the step of recording the correspondence between the first feature corresponding to the first point and the second feature corresponding to the second point, and collecting the correspondences of the alignment operation as the feature data comprises:
   accumulating a number of records of each of the correspondences, and adjusting a weight of the correspondence for the feature comparison according to the accumulated number of records.

8. The method according to claim 1, wherein the step of adjusting at least one of the third curve and the fourth curve to align the third point with the fourth point comprises:
   performing proportional scaling on the third curve or the fourth curve to align the third point with the fourth point.

9. The method according to claim 1, wherein the step of adjusting at least one of the third curve and the fourth curve to align the third point with the fourth point comprises:
   defining a baseline for adjusting the third curve and the fourth curve, and adjusting the third curve or the fourth curve with the baseline as a basis to align the third point with the fourth point.

10. The method according to claim 1, wherein after the step of adjusting at least one of the third curve and the fourth curve to align the third point with the fourth point, the method further comprises:

defining a baseline based on positions of the aligned third point and fourth point, and continuing to adjust at least one of the third curve and the fourth curve with the baseline as a basis.

11. A curve alignment apparatus, comprising:
a data retrieving apparatus, connected to at least one equipment;
a storage apparatus; and
a processor, coupled to the data retrieving apparatus and the storage apparatus, and configured to:
analyze a test sample by at least one microscopic observation apparatus to obtain test data;
retrieve the test data using the data retrieving apparatus to generate a plurality of test curves;
in response to an alignment operation of directing a first point around a first curve to a second point around a second curve among the test curves, record a correspondence between a first feature corresponding to the first point and a second feature corresponding to the second point in the storage apparatus, and collect the correspondences of a plurality of the alignment operation as feature data;
analyze a current sample by the at least one microscopic observation apparatus to obtain current data;
retrieve the current data using the data retrieving apparatus to generate a plurality of current curves;
according to each of the correspondences in the feature data recorded in the storage apparatus, for a third curve and a fourth curve among the current curves, search for a third point matching the first feature on the third curve and a fourth point matching the second feature on the fourth curve;
adjust at least one of the third curve and the fourth curve to align the third point with the fourth point; and
generate a completeness analysis report of the current sample by integrating analysis results of the adjusted at least one of third curve and the fourth curve.

12. The curve alignment apparatus according to claim 11, wherein the processor is further configured to analyze a plurality of features of each of the test curves, and divide the test curves into a plurality of segments according to a shape and a distribution of the features; and record a correspondence between the first feature corresponding to the first point and the second feature corresponding to the second point of each of the alignment operations in each of the segments as the feature data.

13. The curve alignment apparatus according to claim 12, wherein the processor is further configured to, according to each of the correspondences in the recorded feature data of each of the segments, for the third curve and the fourth curve located in a selected segment among the segments, search for the third point matching the first feature on the third curve and the fourth point matching the second feature on the fourth curve; and adjust at least one of the third curve and the fourth curve in the selected segment to align the third point with the fourth point.

14. The curve alignment apparatus according to claim 13, wherein the processor is further configured to, for the current curves in each of the segments, calculate an eigenvalue of the features in each of the current curves; and according to a size of the eigenvalue, select the current curve for alignment in the selected segment.

15. The curve alignment apparatus according to claim 11, wherein the processor is further configured to respectively perform a feature comparison on the third curve and the fourth curve using a sliding window to search for the third point and the fourth point, wherein the feature comparison comprises a slope comparison, a correlation comparison, or a position comparison.

16. The curve alignment apparatus according to claim 15, wherein the processor is further configured to, in response to a confirmation operation for the searched third point and fourth point, adjust at least one of the third curve and the fourth curve to align the third point with the fourth point; and accumulate a number of records of the correspondence between the first feature and the second feature, and adjust a weight of the correspondence for the feature comparison according to the accumulated number of records.

17. The curve alignment apparatus according to claim 11, wherein the processor is further configured to accumulate a number of records of each of the correspondences, and adjust a weight of the correspondence for the feature comparison according to the accumulated number of records.

18. The curve alignment apparatus according to claim 11, wherein the processor is further configured to perform proportional scaling on the third curve or the fourth curve to align the third point with the fourth point.

19. The curve alignment apparatus according to claim 11, wherein the processor is further configured to define a baseline for adjusting the third curve and the fourth curve, and adjust the third curve or the fourth curve with the baseline as a basis to align the third point with the fourth point.

20. The curve alignment apparatus according to claim 11, wherein the processor is further configured to define a baseline based on positions of the aligned third point and fourth point, and continue to adjust at least one of the third curve and the fourth curve with the baseline as a basis.

* * * * *